(12) United States Patent
Bang et al.

(10) Patent No.: US 11,315,590 B2
(45) Date of Patent: Apr. 26, 2022

(54) VOICE AND GRAPHICAL USER INTERFACE

(71) Applicant: S&P Global Inc., New York, NY (US)

(72) Inventors: Grace Bang, New York, NY (US); Azadeh Nematzadeh, Brooklyn, NY (US); Zhiqiang Ma, Jersey City, NJ (US); Xiaomo Liu, Forest Hills, NY (US)

(73) Assignee: S&P Global Inc., New York, NY (US)

( * ) Notice: Subject to any disclaimer, the term of this patent is extended or adjusted under 35 U.S.C. 154(b) by 262 days.

(21) Appl. No.: 16/230,903

(22) Filed: Dec. 21, 2018

(65) Prior Publication Data

US 2020/0202885 A1 Jun. 25, 2020

(51) Int. Cl.
*G10L 15/22* (2006.01)
*G10L 25/54* (2013.01)
*G06F 16/638* (2019.01)

(52) U.S. Cl.
CPC .......... *G10L 25/54* (2013.01); *G06F 16/638* (2019.01); *G10L 15/22* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,194,069 B1 | 3/2007 | Jones et al. | |
| 7,545,917 B2 | 6/2009 | Jones et al. | |
| 7,673,340 B1* | 3/2010 | Cohen | G06F 11/3438 726/22 |
| 8,140,335 B2 | 3/2012 | Kennewick et al. | |
| 8,639,552 B1* | 1/2014 | Chen | G06Q 10/06311 705/7.21 |
| 8,935,249 B2* | 1/2015 | Traub | G06F 16/3331 707/737 |
| 9,098,547 B1* | 8/2015 | Zander | G06F 16/2438 |
| 9,542,697 B1* | 1/2017 | Eidelson | G06Q 30/0256 |
| 10,009,666 B1* | 6/2018 | van Scheltinga | H04W 36/0094 |
| 10,496,705 B1* | 12/2019 | Irani | G06F 9/44 |

(Continued)

OTHER PUBLICATIONS

Folstad and Skjuve, "Business and pleasure? Relational interaction in conversational UX," 2018, 6 pages.

(Continued)

*Primary Examiner* — Jakieda R Jackson
(74) *Attorney, Agent, or Firm* — Fish & Richardson P.C.

(57) ABSTRACT

Methods, systems, and apparatus, including computer programs encoded on computer storage media, for voice and graphical user interfaces. One of the methods includes receiving an audio input, analyzing the audio input to determine a requested task, determining response data in response to the requested task, determining at least a first part of the response data to be presented as an audio output and at least a second part of the response data to be presented as a visual output, forwarding the first part of the response data to an audio output for presentation to a user, forwarding the second part of the response data to a visual output for presentation to a user; and forwarding to at least one of the audio output and the visual output data describing sources and/or assumptions used to construct the response data.

25 Claims, 8 Drawing Sheets

(56) References Cited

U.S. PATENT DOCUMENTS

| | | | |
|---|---|---|---|
| 10,572,473 B2* | 2/2020 | Allen | G06F 16/243 |
| 2003/0154162 A1 | 8/2003 | Danaher et al. | |
| 2006/0129932 A1* | 6/2006 | Weber | G06F 40/18 |
| | | | 715/705 |
| 2007/0019634 A1* | 1/2007 | Fisher | H04M 3/42221 |
| | | | 370/352 |
| 2007/0162316 A1* | 7/2007 | Kratschmer | G06Q 10/06312 |
| | | | 705/7.22 |
| 2007/0192372 A1* | 8/2007 | Bestgen | G06F 16/24 |
| 2008/0140348 A1* | 6/2008 | Frank | G06Q 10/06 |
| | | | 702/181 |
| 2012/0233631 A1* | 9/2012 | Geshwind | H04N 21/2547 |
| | | | 725/1 |
| 2012/0265760 A1* | 10/2012 | Yan | G06F 16/951 |
| | | | 707/740 |
| 2013/0085798 A1* | 4/2013 | Spatola | G16H 40/20 |
| | | | 705/7.24 |
| 2013/0247162 A1* | 9/2013 | Menon | H04L 63/08 |
| | | | 726/7 |
| 2013/0266127 A1* | 10/2013 | Schachter | H04M 3/5175 |
| | | | 379/88.01 |
| 2013/0275164 A1* | 10/2013 | Gruber | G10L 17/22 |
| | | | 705/5 |
| 2016/0140190 A1* | 5/2016 | Moncrieff | G06F 16/248 |
| | | | 707/722 |
| 2016/0171062 A1* | 6/2016 | Bufe | H04L 67/36 |
| | | | 707/722 |
| 2016/0224939 A1* | 8/2016 | Chen | G06Q 10/06311 |
| 2016/0225370 A1* | 8/2016 | Kannan | G10L 15/063 |
| 2016/0371464 A1* | 12/2016 | Bricker | A24F 47/00 |
| 2017/0243518 A1* | 8/2017 | Kanemaru | G06F 16/00 |
| 2018/0211658 A1* | 7/2018 | Segal | G10L 15/08 |
| 2018/0260860 A1* | 9/2018 | Devanathan | G06F 40/30 |
| 2019/0027255 A1* | 1/2019 | D'Amelia | G08B 31/00 |
| 2019/0042988 A1* | 2/2019 | Brown | G06F 16/9535 |
| 2019/0098039 A1* | 3/2019 | Gates | G06N 3/0427 |
| 2019/0138648 A1* | 5/2019 | Gupta | G06F 16/3329 |
| 2019/0236140 A1* | 8/2019 | Canim | G06F 40/30 |
| 2019/0236511 A1* | 8/2019 | Xu | G06Q 10/0639 |
| 2019/0272372 A1* | 9/2019 | Ananthanpillai | G06F 21/554 |
| 2019/0340701 A1* | 11/2019 | Tayal | G06Q 10/06313 |
| 2020/0034492 A1* | 1/2020 | Verbeke | G06F 40/40 |
| 2020/0098358 A1* | 3/2020 | Rakshit | G06F 16/24575 |
| 2020/0184961 A1* | 6/2020 | Rohatgi | G10L 15/22 |
| 2020/0218585 A1* | 7/2020 | Dotan-Cohen | G06Q 10/06311 |

OTHER PUBLICATIONS

Frohlich, David, and Owen Daly-Jones. "Voicefax: A shared workspace for voicemail partners," Conference companion on Human factors in computing systems, ACM, pp. 308-309, May 7, 1995.

Ishii, "TeamWorkStation: towards a seamless shared workspace," Proceedings of the 1990 ACM conference on Computer-supported cooperative work, ACM, pp. 13-26, Sep. 1, 1990.

James and Roelands, "Voice over Workplace (VoWP): voice navigation in a complex business GUI," Proceedings of the fifth international ACM conference on Assistive technologies, ACM, pp. 197-204, Jul. 8, 2002.

Kocielnik et al., "Designing for Workplace Reflection: A Chat and Voice-based Conversational Agent," Proceedings of the 2018 on Designing Interactive Systems Conference 2018, ACM, pp. 881-894 Jun. 8, 2018.

López, et al., "Alexa vs. Siri vs. Cortana vs. Google Assistant: a comparison of speech-based natural user interfaces," International Conference on Applied Human Factors and Ergonomics, pp. 241-250, Jul. 17, 2017.

Luger et al., "Like having a really bad PA: the gulf between user expectation and experience of conversational agents," Proceedings of the 2016 CHI Conference on Human Factors in Computing Systems. ACM, pp. 5286-5297, May 7, 2016.

McGregor and Tang, "More to Meetings: Challenges in Using Speech-Based Technology to Support Meetings," CSCW pp. 2208-2220, Feb. 25, 2017.

Porcheron et al., "Voice Interfaces in Everyday Life," Proceedings of the 2018 CHI Conference on Human Factors in Computing Systems, ACM, p. 640, Apr. 21, 2018.

Portet et al., "Design and evaluation of a smart home voice interface for the elderly: acceptability and objection aspects," Personal and Ubiquitous Computing 17(1):127-144, Jan. 1, 2013.

Sciuto et al., "Hey Alexa, What's Up?: A Mixed-Methods Studies of In-Home Conversational Agent Usage," Proceedings of the 2018 on Designing Interactive Systems Conference, ACM, pp. 857-868, Jun. 8, 2018.

* cited by examiner

VOICE AND GRAPHICAL USER INTERFACE

BACKGROUND

Technical Field

This specification relates to smart devices for a workplace setting.

Background

Voice assistants or voice command devices are now widely available to consumers. The accuracy of the most-popular voice assistant systems, e.g., the rate at which such a system correctly detects a word in a user command, has improved over time. Moreover, many of the most popular voice assistant systems can accurately handle distinct speaking styles. As the functionality of voice assistants continues to improve, the number of consumers using voice assistants will also grow.

SUMMARY

This specification describes technologies for voice user interface (VUI) systems and methods. Embodiments of a VUI system can include modules that are building blocks for common analytics operations. Embodiments can include a design framework for a VUI that encompasses the modules to assist analysts in completing tasks required for completion of their analytical work.

There is a need for the application of a VUI to assist in completing work related tasks. Organizations and companies would benefit from using a VUI as part of a virtual assistant system. VUI systems can make employees more efficient. Currently, it takes an analyst significant time and effort and numerous steps to complete the various tasks that go into a typical analysis. An analyst's work on these tasks can be error-prone and the tasks performed can vary across analysts.

There is a need for VUI systems that allow analysts to more naturally and efficiently interact with computing devices. These foundational tasks such as information retrieval (including document retrieval), complex numerical computation (such as spreadsheet calculations), data visualization, and prediction/projection are time consuming, require multiple steps to complete and typically do not have a standardized and efficient way of being accomplished. Analysts currently do not have the ability to provide audio input and receive output, in both audio and visual form, to complete their analytical tasks. Such a VUI system, described further in this specification, can assist analysts efficiently complete the tasks that are regularly part of their workflow. The VUI system can also allow analysts to more naturally and efficiently interact with analytic and intelligent devices.

In general, one innovative aspect of the subject matter described in this specification can be embodied in methods that include that actions of: receiving an audio input; performing speech recognition on the audio input to produce recognized speech data; analyzing the recognized speech data to determine a requested task; determining response data in response to the requested task; determining at least a first part of the response data to be presented as an audio output and at least a second part of the response data to be presented as a visual output; forwarding the first part of the response data to an audio output for presentation to a user; forwarding the second part of the response data to a visual output for presentation to the user; and forwarding to at least one of the audio output and the video output data describing sources used to construct the response data.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method can select a task from a predetermined group of tasks. The predetermined group of tasks can include document retrieval, information retrieval, data visualization, numerical computation and prediction (e.g., either performance prediction or prediction of a score/rating change). The method can also comprise receiving input subsequent to the presentation of the response data. The audio input can be a second audio input and the method can further include receiving a first audio input as activation audio, forwarding, in response to the activation audio, help data to at least one of the audio and visual outputs, where the help data can for example indicate the types of task requests that are available to the user, assist the user in the navigation of the overall functionality of the system, and/or indicate to the user the most efficient way to complete a task. The method can further include recommending to the user at least one of tasks or data for the user to pursue in a further request based at least in part on at least one of the requested task and the response data.

The method can analyze the audio input to determine a request by performing speech recognition on the audio input to produce recognized speech, and determining a request based on the recognized speech.

The rationale can include an indication of the sources of data used in determining the response data. In analyzing the audio input to determine a request, the method further comprises detecting an intent of a user's audio input and processing the intent to determine a request.

The audio input can be a first audio input and a second audio input can comprise rationale request audio requesting a rationale for the response data, wherein forwarding the rationale for the response data comprises forwarding the rationale for the response data in response to the rational request audio.

Another innovative aspect of the subject matter described in this specification can be embodied in methods that include the actions of: receiving an audio input; analyzing the audio input to determine a request; determining response data in response to the request; determining that at least a first part of the response data is to be presented as an audio output and at least a second part of the response data is to be presented as a visual output; forwarding the first part of the response data to an audio output; forwarding the second part of the response data to a visual output; forwarding to at least one of the audio output and the video output a rationale for the response data; and recommending at least one of a task and data related to the requested task for the user to pursue in a further request.

Yet another innovative aspect of the subject matter described in this specification can be embodied in a system including one or more computers and one or more storage devices on which are stored instructions that are operable, when executed by the one or more computers, to cause the one or more computers to perform operations including: receiving audio input; analyzing the audio input to determine a requested task; determining response data in response to the requested task; determining at least a first part of the response data to be presented as an audio output and at least a second part of the response data to be presented as a visual output; forwarding the first part of the response data to an audio output for presentation to a user; forwarding the second part of the response data to a visual output for presentation to the user; and forwarding to at least one of the audio output and the visual output data describing sources used to construct the response data.

The subject matter described in this specification can be implemented in particular embodiments so as to realize one or more of the following advantages. VUI systems and methods described in this specification help analysts perform foundational and complex tasks more efficiently relative to current computing tools. These systems and method help analysts become more efficient by assisting with tasks that take significant time and effort and involve multiple steps to complete. Tasks such as generalized document retrieval, information retrieval, financial and numerical computation, data visualization, prediction or projection are time consuming, require multiple steps to complete, and often have no standardized and efficient way of being accomplished. VUI systems and methods described in this specification can help analysts complete such tasks. The system can also provide useful help messages to assist an analyst to efficiently complete tasks in a significantly reduced time frame, with less effort, and with fewer steps. The help message functionality is able to accomplish these benefits by, for example, providing analysts with guidance on the most efficient manner to complete a given task using the system. The system also provides help messages to ensure that a user is aware of the full capabilities of the VUI system. Further, embodiments of this VUI system facilitate a more natural and 'human' interaction. A VUI system with natural and human interactions provides a more conducive environment for back-and-forth iterations.

Stated differently, the VUI systems and methods described in this specification have broad implications for the use of VUIs in the workplace. These systems and methods are designed to ensure that users are aware of the capabilities that a VUI system provides. The use of such VUI systems by analysts increases job performance, productivity, and effectiveness compared to when analysts use currently available tools to complete typical analyst tasks. Analysts who use such a VUI system are able to complete data and document retrieval, complex numerical computation (such as manipulation of data in a spreadsheet), visualization and projection tasks in a significantly reduced time frame with less effort (e.g., number of steps) required. Such VUI systems also reduce complexity of data (e.g., document) retrieval tasks and analysts perceive such VUI systems as useful for many tasks.

VUI systems and methods described in this specification can determine which response data to provide via an audio output and which data to provide via a visual input. Furthermore, such VUI systems and methods can (e.g., upon request) provide data, by audio and/or video output to explain the data provided in response to a request, e.g., to cite the data sources used in compiling the response data.

The suggest and rationale functionality also provide significant advantages. Once a user provides an audio input and receives an audio and visual output back from the system, the suggest functionality offers additional data items, documents, computations, visualization, or projections that the user may want to receive based, e.g., on the previously submitted audio input or series of previously submitted audio inputs. This suggest functionality allows the user to explore additional items that may not have been obvious to explore or not something of which the user was previously aware.

One objective of the rationale functionality is to provide a user with comfort in, and an understanding of, the assumptions that went into the previously provided output. For example, if a user asks for a projection about the performance of a company and upon receiving a response, asks the system why, the subsequent output provided by the system reveals the source or assumptions that went into that projection output. An advantage for the rationale function for analysts is that a task like projections is composed of a compilation of multifold assumptions and/or data. The system is more useful if it can expose these assumptions and data sources to the user so that the user can evaluate whether or not those assumptions are valid or the proper data is incorporated, from his perspective. The rationale functionality can help to encourage a user to trust the response the user receives from the system. The application of this rationale functionality on a VUI system, e.g., by allowing a user to ask a simple 'why?' is advantageous in that these series of interactions mimic closely the more conversational nature of discussions among analysts. An additional advantage of a conversational interaction is that such an interaction results in faster completion of tasks and requires less steps. Such conversations interactions also lowers the barriers for users to ask such a VUI system for a rationale for a provided response. In other words, such a VUI system encourages an analyst to request the rationale behind a response. Another general advantage of the rationale functionality is the ability for the user to get comfortable with the operations of the system, through obtaining data on the source or assumptions, leading to the user to be more likely to trust the correctness of the response.

Additionally, while some of the tasks described above can be relatively straightforward, they end up taking a significant amount of professional, e.g., analyst time. Thus improving user interactions for these types of tasks can have a large impact. Overall, the nature of the problem and tasks is quite generic since it tackles an industry challenge of preforming highly complex analysis given large amounts of heterogenous data (including unstructured data). The foundational modules or tasks of analysis can be relevant in a broad set of industries that are dealing with any sort of large unstructured data. The tasks chosen here address the overall challenges and the application code can easily be tuned to satisfy questions for other industry specific questions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
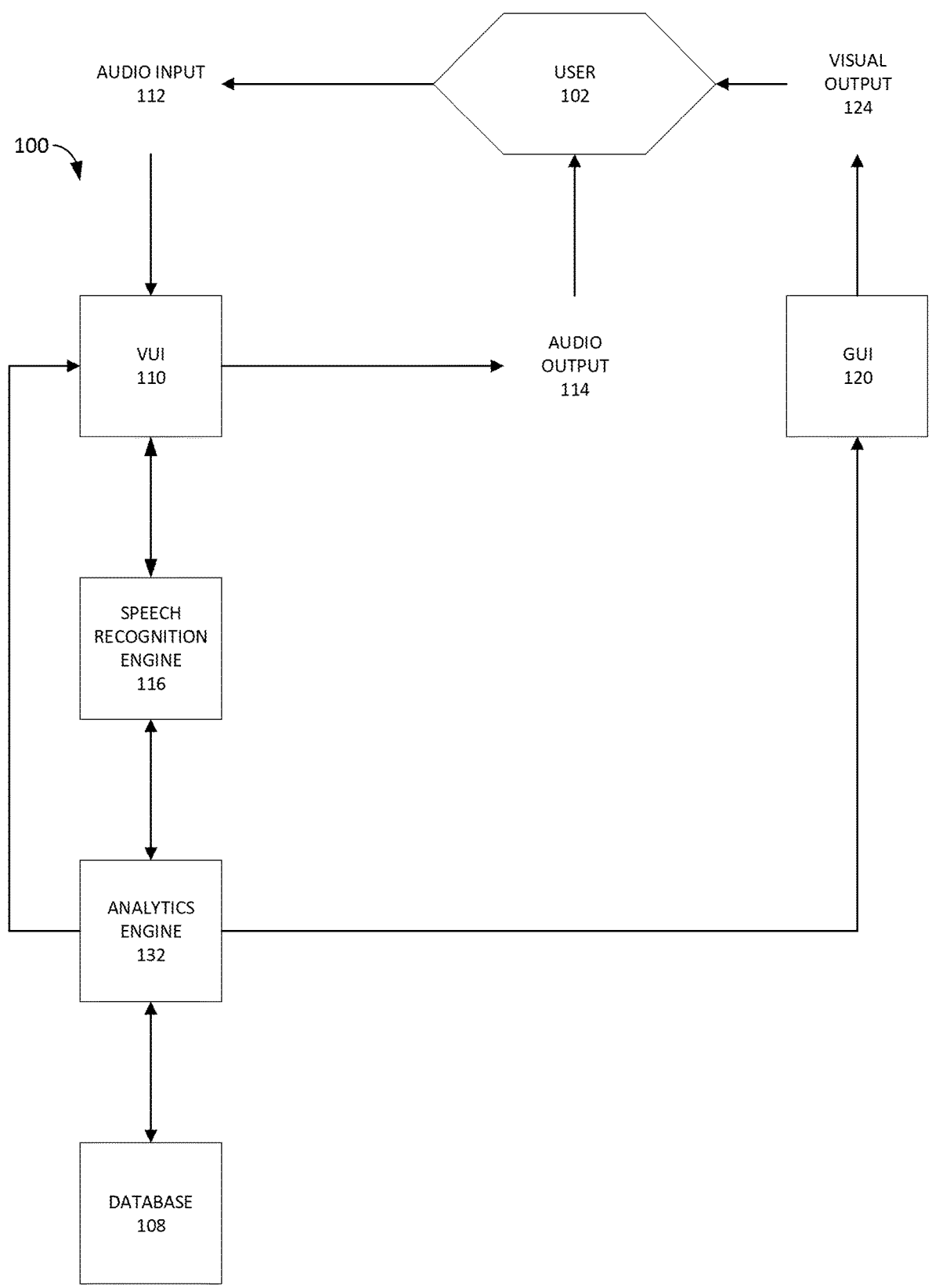
FIG. 1 is a block diagram of one example of a combined voice user interface (VUI) and graphical user interface (GUI) system.

This specification relates to a voice user interface for analysts to use in completing the foundational tasks and more complex tasks commonly performed in their analytical work. Currently, it takes analysts significant time and effort, e.g., it takes a number of steps, to complete the various types of tasks that go into common analyst work. These tasks are error-prone, i.e., analysts regularly make mistakes when completing these tasks. An analyst does not currently have the ability to provide audio input, e.g., including a request for the completion of a specified task, to a system and receive audio output and visual output, as part of completing analytical work.

The rapid growth of speech pattern recognition techniques, machine learning and hardware platforms make it possible to develop voice user interfaces (VUI) for users to more naturally interact with computers or electronic devices.

The market leaders of personal VUI devices have branded their devices as smart home device that you can control with your voice. Therefore, the designed interactions within these devices focus on the daily life in the household. There remains a need for better and more intelligent voice-user interfaces for the workplace environment, particularly for analysts.

The VUI systems and methods described in this specification can assist financial analysts with different types of tasks they complete as part of their workflow. Often these tasks are time consuming, require multiple steps to complete, and have no standardized and efficient way of completing them.

Document retrieval task: An analysts often gathers multiple and disparate data sources to consider in the analysis including filings, news, market data, earnings call transcripts, sell side equity analyst's opinions, and presentations from company management. All of these documents are located in different sites and require multiple steps, and consequently time, to retrieve.

Information retrieval task: An analyst often collects specific data points across various documents depending on the type of analysis the analyst does. For example, for analysis on a company, an analyst may need information on the risks that a company faces or any new products that a company is launching. The analyst often reads documents, performs a keyword search in a document or searches in databases to extract the data. Thus, data extraction can be tedious and time consuming, especially for a newer analyst who is not as familiar with a reports' structure as a more experienced analyst would be. This task could represent a multistep task where the answer could be laid out in free form unstructured text.

Complex numerical computation task: An analyst often performs complex numerical computations on gathered numeric data to identify meaningful patterns and trends. This can involve complex calculations, e.g., interlinking statements and calculating a debt paydown schedule. Analysts often use a spreadsheet to build models and perform computations. Such a task requires multiple steps and significant time to ensure that formulas are properly entered. This task could represent a multistep task involving retrieving information from unstructured text but where information is present in tabular form.

Data visualization task: Analysts use charts and tables to represent data and make comparisons. For example, when assessing how the long-term trend of a metric of interest for a company is performing compared to other companies in a sector, an analyst could look at raw data or the analyst can visualize the data. An analyst often uses a spreadsheet to graph or otherwise visualize data. The analyst typically needs to select and enter the x- and y-axis labels, titles, and data, all of which are typically performed on a computer using a mouse and a keyboard.

Prediction/projection task: Because decisions regarding how and whether to interact with an entity, e.g., a company, are often based on expectations of future performance of the entity, an analyst can spend meaningful time compiling projections for a company's performance. This task often combines and builds upon the other tasks that are listed above. The ingestion and analysis of all this data requires analysts to complete multiple processes in parallel. An analyst often aggregates the data, analyzes the data and provides expectations regarding various metrics for a company being analyzed.

The system and methods described in this specification can apply a VUI to the work of analysts. To do so, certain embodiments combine the use of a VUI with a graphical user interface (GUI). Embodiments can include a voice user interface function 118, e.g., an analyst assistant, which can be used by analysts in the performance of analysis-related tasks. The developed function includes several use cases relevant to the tasks mentioned above. The user can trigger the function to receive help, suggestions, or explanations while the user is working on analysis-related tasks.

FIG. 1 shows an example VUI system 100. The system 100 includes: a voice user interface engine 110 that receives audio input 112 and can produce audio output 114 (based at least in part on analysis data received from an analytics engine 132 described further below); a speech recognition engine 116 that receives audio input data from the VUI and recognizes speech data in the audio input data; an analytics engine 132 that receives speech data from the speech recognition module and analyzes the speech data to produce analysis data; a database 108 and a graphical user interface 120 that can receive analysis data from the analytics engine and provide graphical data to a user 102.

Figure 2A:
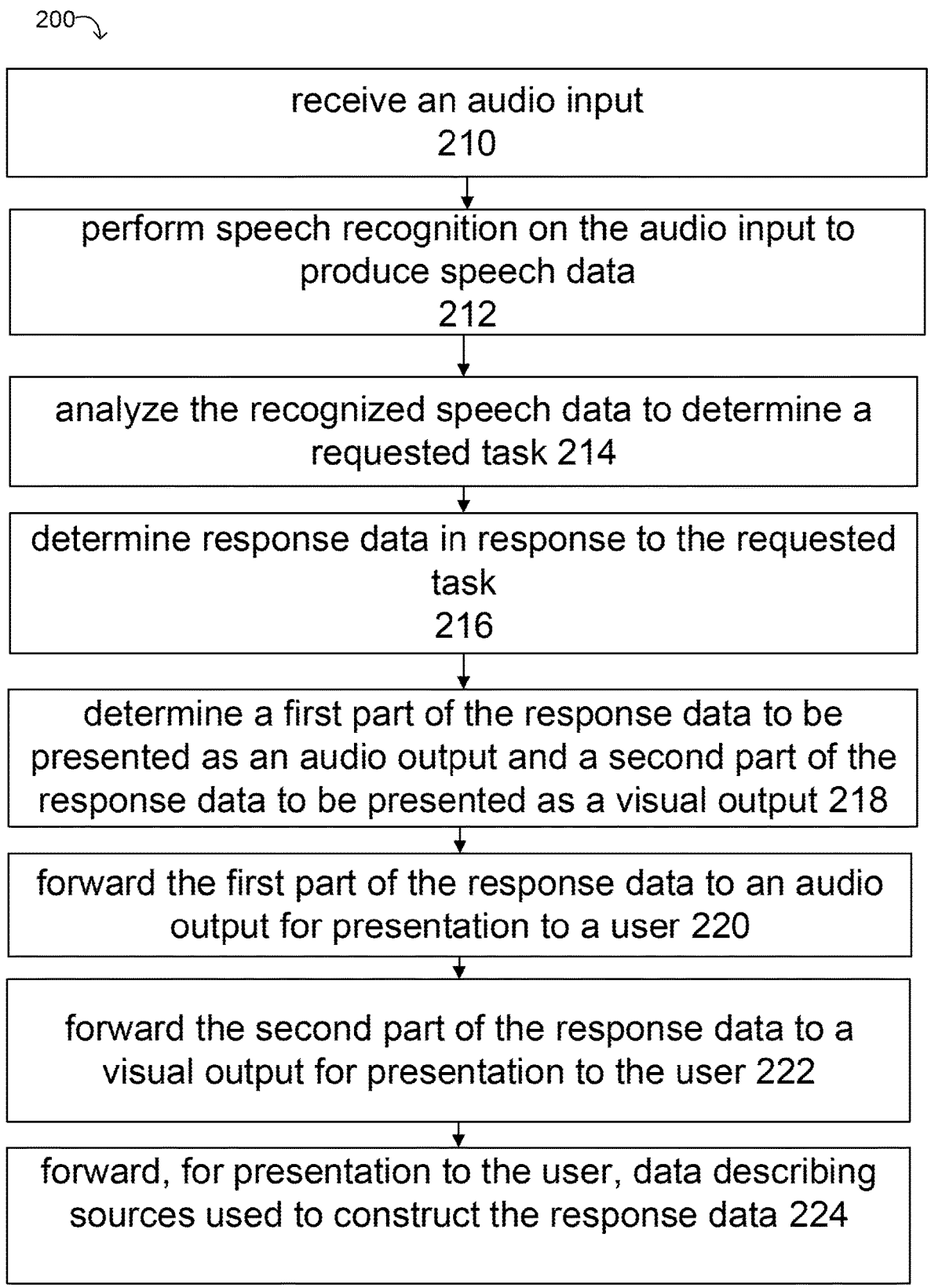
FIG. 2A is an example of a process by which a user can interact with the system of FIG.

FIG. 2A is a flowchart of an example process 200 for assisting a user with complex tasks involving retrieving data from multiple sources. For convenience, the process 200 will be described as being performed by a system of one or more computers, located in one or more locations, and programmed appropriately in accordance with this specification. For example, a VUI system, e.g., the VUI system 100 of FIG. 1, appropriately programmed, can perform the process 200.

Referring now to FIGS. 1 and 2A, when the user 102 executes a command with the VUI system 100 by speaking the command in range of a microphone with a connection to the VUI system 100, the VUI engine 110 receives 210 audio input. The VUI engine 110 forwards the audio input to a speech recognition engine 116. The speech recognition engine performs 212 speech recognition on the audio input to produce recognized speech data. Embodiments of the VUI system 100 can operate with and/or incorporate a variety of speech recognition platforms. The speech recognition engine in turn provides speech data to the analytics engine 132. The analytics engine analyzes 214 the recognized speech data to determine a requested task and determines 216 response data in response to the requested task. In determining the response data, the analytics engine 132 can access data in database 108. The analytics engine determines 218 at least a first part of the response data to be presented as an audio output and at least a second part of the response data to be presented as a visual output, forwards 220 the first part of the response data to an audio output for presentation to a user, and forwards 222 the second part of the response data to a visual output for presentation to the user. In addition, the analytics engine forwards 224 to at least one of the audio output and the video output data describing sources used to construct the response data.

Figure 2B:
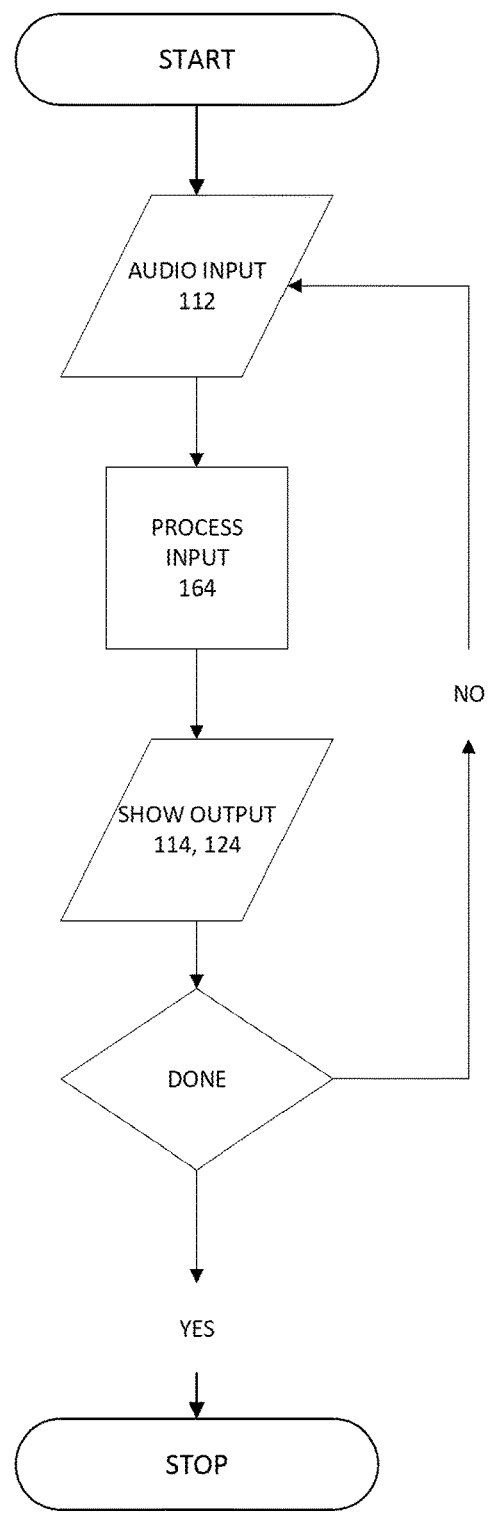
FIG. 2B is a different illustration of an iterative process by which a user can interact with the system of FIG. 1.

FIG. 2B is a different illustration of an iterative process by which a user can interact with the VUI system 100 of FIG. 1. The system 100 takes the audio input 112, processes the input 164, and produces output to the user as an audio output 114, a visual output 124, or both. If the task is complete, the process stops. If the task is not complete, the user 102 provides another audio input 112 to the system 100.

The system 100 anticipates potential challenges of interacting with a VUI system. To enhance usability, to create a delightful user-experience, and to increase the acceptance of the newly developed product, certain embodiments of the system 100 follow the process of interaction design in designing user interfaces (UI). Designing a VUI system 100 requires further consideration and introduces new challenges in comparison to designing a system for interacting with a user employing only a GUI.

An embodiment of a VUI system described in this specification provides a framework to inform users about its functionality and guide users on how to interact with the system in a manner that is comparable to a GUI system that provides visuals to achieve this outcome. For example, the VUI system can include an introduction message, which is stated by the VUI 110 after a user 102 triggers the voice interface with an audio input 112, perhaps using a activation word, phrase or gesture.

After the activation word, the user can further specify a specific function, e.g., by asking the VUI system to engage an "analyst assistant" and the VUI system can provide a welcome message as an audio output 114, such as: "Welcome to the Analyst Assistant! You can ask me about business operating segments, growth rate, and projected rolling twelve-month growth of companies. I can also find a document or draw a graph. Say help to learn more about my functionality."

Figure 3:
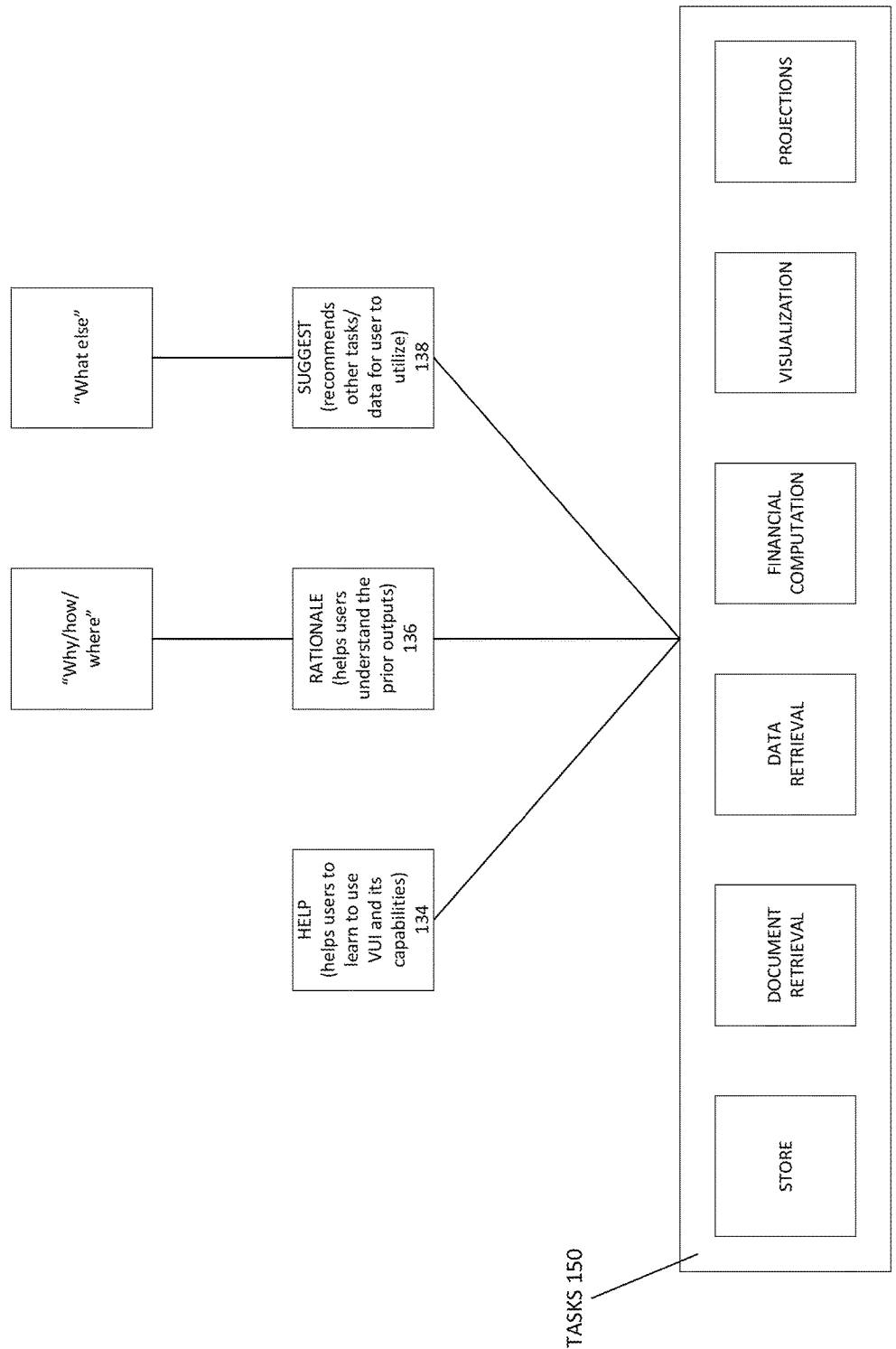
FIG. 3 is a block diagram depicting one example of how various function modules interact with various task modules.

FIG. 3 is a block diagram depicting one example of how various general function modules interact with various task modules. The general function modules include a help module 134 that helps users to make use of the VUI system and understand its capabilities (for example indicate the types of task requests that are available to the user, and assist the user in the navigation of the overall functionality of the system, and/or indicate to the user the most efficient way to complete a task), a rationale module 136 that helps user understand the basis for a prior output of the system, and a suggest module 138 that recommends other tasks/data that the user might want to request. The task modules 150 can include store, document retrieval, non-document information retrieval, financial or other complex numerical computation, visualization and/or projection modules.

Users may not know or remember all of the functionality, e.g., all of the use cases, that the VUI system 100 offers. Thus, with reference to FIG. 3, the system 100 can include a help function 134 to assist users. The help function can be activated by saying a trigger word, e.g, 'help', during an interaction. The help module of the VUI system can then ask a user for which specific task 150 the user needs help and provide help based on the user's answers. For example, a help message may say: "How can I help you? You can say help with finding information, help with finding a document, help with financial computations, help with projections, or help with visualization." In certain embodiments, users can access the 'help' functionality at any time during use of the VUI system.

The system can instruct a user through the help functionality 134 about the types of voice commands the user can use as well as the use cases, operations, and tasks the VUI system is capable of executing. The help function 134 can suggest a possible utterance when the VUI 110 cannot answer the user's 102 command. For instance, the user may ask the VUI 110: "what was the revenue growth of Company A in 2017?"

Another design challenge is the manner of conversation that users often prefer when interacting with a VUI system. The system can respond to different formations of a request to facilitate user interactions with the VUI. For example different formulations of a request can include terms such as 'please,' 'can you,' or 'do you have.' For instance, the following utterances can be used for an information retrieval task:

"Please tell me what are Company A's business segments?";

"Can you tell me what are Company A's business segments?";

"Please tell me what are Company A's business operating segments according to the latest 10K?";

"What are Company A's business segments?"

Referring to FIGS. 1 and 3, certain embodiments of the VUI system 100 can anticipate that a user may be interested in the underlying rationale behind the VUI system's answer, especially when a task 150 relates to looking into multiple data sources, building a computational model, or making a projection. To this end, the VUI system 100 can include a rationale module 136 to provide an underlying rationale for a VUI output. The system 100 can encourage a user 102 to ask follow up questions. For example, after the answer is given, and using the rationale module 136, the VUI system can tell the user 102 that the user 102 can ask 'why?'. If the user indeed asks "why," the VUI system explains the audio output 110 and/or visual output 120 that was provided to the user 102. The visual information that the VUI system can create and the documents that it retrieves can be displayed via a GUI and then stored in a cloud storage folder for future use. Stated differently, the system can treat "why?", "how?" or "where?" as a follow up questions to the most recent query or series of previously submitted queries. In certain embodiments, to ask "why?" for a new and unrelated process, a user would need to use the activation word followed by the query.

In addition, the VUI system 100 can include a suggest module that recommends other tasks or data for the user to consider. For example, after a user has gathered performance data for a company, the suggest module may ask what else the user might be interested in regarding company A or the suggest module might suggest that the user request a visualization of the gathered performance data.

Figure 4:
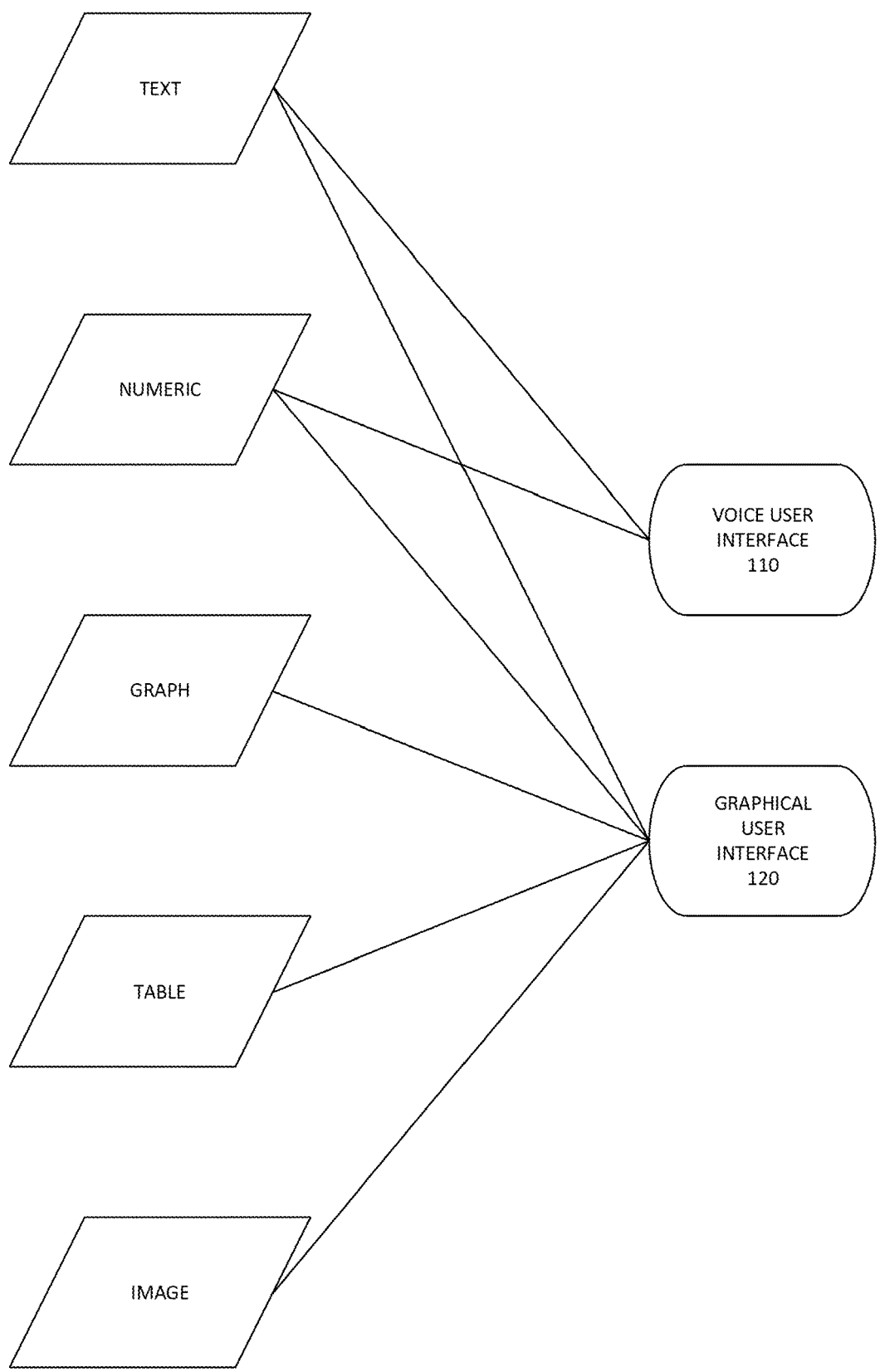
FIG. 4 is an example of the types of expected output for the tasks and identifies whether those output types are appropriate for audio output, visual output or both.

FIG. 4 is an example of the types of expected output for the task modules of FIG. 3 and identifies whether those output types are appropriate for audio output, visual output or both. The output data can be text, numeric, graphical, tabular, or image/video all of which can be displayed using a GUI. In contrast, of these five types of output data typically certain types of text and numeric data will be provided via an audio output.

Figure 5:
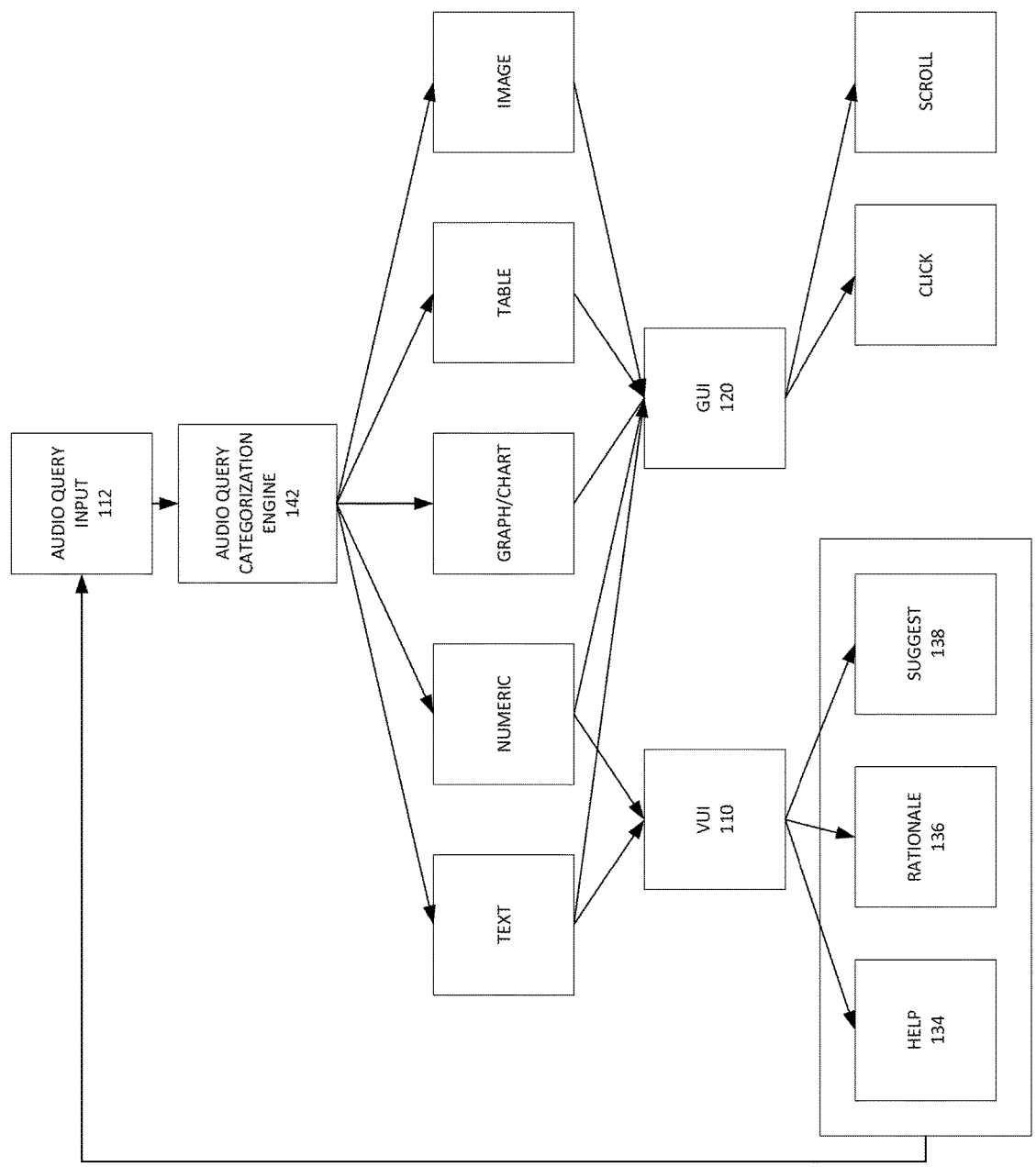
FIG. 5 depicts another example of a VUI system.
Figure 6:
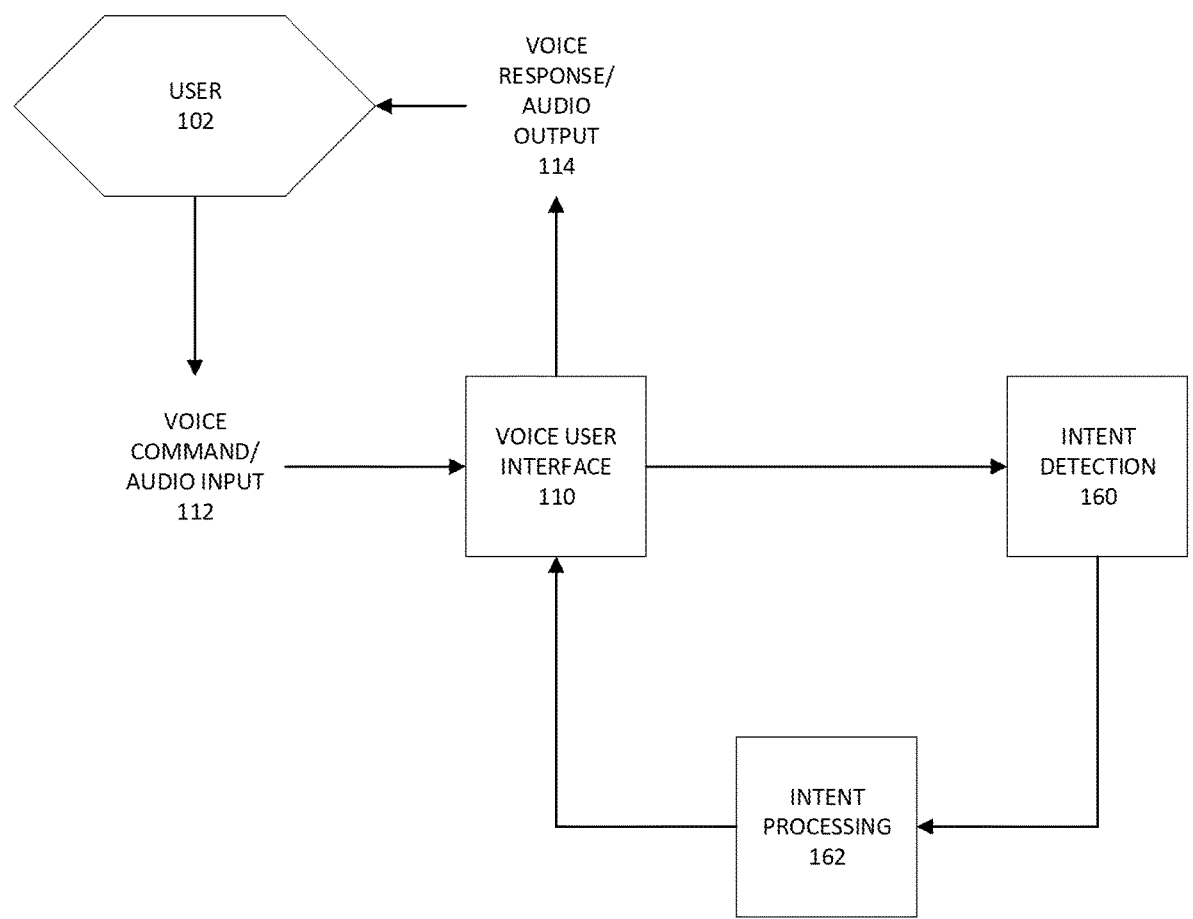
FIG. 6 is an example of a VUI system performing intent detection and processing.

FIGS. 5 and 6 further detail an interaction iterations between a VUI and GUI system and a user. FIG. 5 depicts an example of a VUI system. The VUI system first receives an audio query input 112. The audio query input 112 is categorized by the audio query categorization module 142. This query categorization module 142 is further depicted in FIG. 6 where the user provides a voice input 112 to the VUI 110, the system detects the intent 160 and processes the intent using an intent processor 162 and provides a response through the VUI 110 to the user 102 as an audio output 114, visual output, or both. Based on the output provided by that module, the system 100 provides text, numeric, graphical, tabular, and/or image results. The system specifies which type of results are shown in the VUI 110 versus the GUI 120. The user 102 then has the ability to further interact with the system output in specific ways based on whether the result was presented via the VUI 110 or GUI 120. When the result is presented in the VUI 110, the user can invoke the help, rationale or suggest modules 134, 136, 138 in which case the user can follow-up with another audio query input 112. Alternatively, the user can click or scroll through the content presented via the GUI 120.

Figure 7:
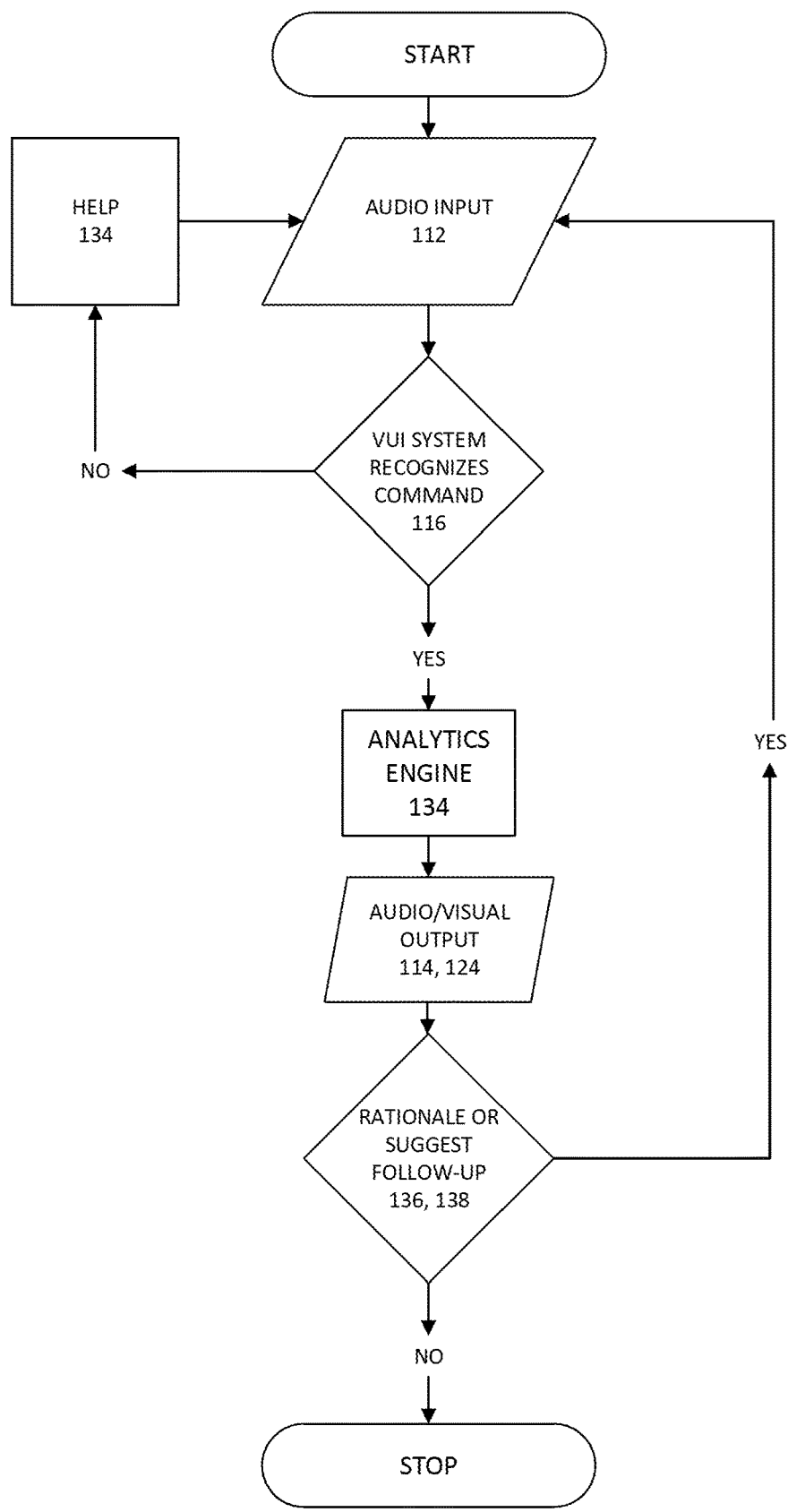
FIG. 7 illustrates an example of an iterative process in which a user can use response help, rationale, and/or suggest functionality.

FIG. 7 illustrates an example of an iterative process in which a user can use response help functionality, rationale functionality, and/or suggest functionality 134, 136, 138. The process starts by receiving audio input 112. The VUI system then recognizes 116 a command in the audio input (e.g., by using speech recognition also referred to as intent detection). If the VUI system is not able to recognize a command in the audio input it may invoke a help module 134 to provide some help prompts the user.

When the VUI system does recognize a command, the recognized command is forwarded to an analytics engine 134 that produces a response to the command. The response is then forwarded to an audio and/or a visual output 114, 124. After the response is provided to the user, the rationale or suggest modules can be invoked to solicit further audio input 112. If the response and suggest modules are not invoked by the user or the VUI system then the process stops.

Certain embodiments of systems and methods described in this specification combine a VUI with a GUI to assist and improve the work of analysts in completing common complex tasks. These embodiments can:

1. Identify specific types of tasks that could be completed by an analyst;
2. Implement the VUI system for each of the specific types of tasks of documentation retrieval, information retrieval, complex numerical computation, data visualization, and projection;
3. Incorporate elements that enable analysts to multi-task and increase overall productivity and performance;
4. Provide a way for an analyst to interact with the VUI system to allow the analyst to complete the usual tasks of their workflow effectively with less number of steps and in a timely manner;
5. Reduce cognitive overload of analysts by simplifying the process of manual search and information extraction from numerous documents;
6. Incorporate a rationale module so that the output of the VUI is transparent and analysts can learn about the rationale behind the VUI's answer through voice interaction while working on a task;
7. Incorporate element to increase usability of the interface, increase its adoptability, and build trust about the correctness of the answer;
8. Incorporate a suggest module;
9. Are not limited to answering questions for a single simple task (e.g., can answer questions about the sub tasks of a more complex task); and
10. Allow analysts to input audio as a form of command (allowing analysts to get information more easily while on the go, without looking down at a screen and typing).

For situations involving sensitive data, the system can provide different users with different access to the sensitive data. The system can provide security protocols and encryption while transferring sensitive data, and access control to various users.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

An electronic document, which for brevity will simply be referred to as a document, may, but need not, correspond to a file. A document may be stored in a portion of a file that holds other documents, in a single file dedicated to the document in question, or in multiple coordinated files.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving audio input;
performing speech recognition on the audio input to produce recognized speech data;
analyzing the recognized speech data to determine a requested task;
categorizing, using an audio query categorization module, the recognized speech into a requested task category;
determining response data in response to the requested task;
determining, based at least in part on the requested task category, at least a first part of the response data to be presented as an audio output and at least a second part of the response data to be presented as a visual output, wherein the requested task category is, at least in part a graphical category;
forwarding the first part of the response data to an audio output for presentation to a user;
forwarding the second part of the response data to a visual output for presentation to the user the second part of the response incorporating a graph; and
forwarding, to the visual output, rationale data describing sources of data incorporated into the response data wherein the sources include at least one of filings, news, market data, earnings call transcripts, sell-side equity analyst's opinions, and presentations from company management.

2. The method of claim 1, wherein the task is selected from a predetermined group of tasks.

3. The method of claim 2, wherein the predetermined group of tasks comprises: document retrieval, information retrieval, numerical computation, data visualization, and prediction.

4. The method of claim 1, wherein the method further comprises receiving input subsequent to presentation of the response data.

5. The method of claim 1, wherein the audio input is second audio input and the method further comprises:
receiving first audio input comprising activation audio;
forwarding, in response to the activation audio, help data to at least one of the audio and visual outputs, the help data indicating types of task requests that are available to the user.

6. The method of claim 1, wherein the method further comprises recommending at least one of a task and data for the user to pursue in a further request based at least in part on at least one of the requested task and the response data.

7. A method comprising:
receiving an audio input;
analyzing the audio input to determine a request;
categorizing, using an audio query categorization module, the request into a request category;
determining response data in response to the request;
determining, based at least in part on the request category, that at least a first part of the response data is to be presented as an audio output and at least a second part of the response data is to be presented as a visual output, wherein the request category is, at least in part, a graphical category;
forwarding the first part of the response data to an audio output;
forwarding the second part of the response data to a visual output, the second part of the response incorporating a graph;
forwarding to the visual output a rationale for the response data wherein the sources include at least one of filings, news, market data, earnings call transcripts, sell-side equity analyst's opinions, and presentations from company management; and
recommending at least one of a task and data related to the requested task for the user to pursue in a further request.

8. The method of claim 7, wherein the audio input is first audio input and wherein the method further comprises receiving second audio input comprising rationale request audio and wherein forwarding the rationale for the response data comprises forwarding the rationale for the response data in response to the rationale request audio.

9. The method of claim 7, wherein analyzing the audio input to determine the request comprises performing speech recognition on the audio input to produce recognized speech and determining the request based on the recognized speech.

10. The method of claim 7, wherein the rationale comprises an indication of at least one of sources of data and assumptions used in determining the response data.

11. The method of claim 7, wherein analyzing the audio input to determine the request further comprises:
detecting an intent of the user's audio input; and
processing the intent to determine the request.

12. The method of claim 7, wherein the task is selected from a predetermined group of tasks.

13. The method of claim 12, wherein the predetermined group of tasks comprises: document retrieval, information retrieval, data visualization, and prediction.

14. The method of claim 7, further comprising determining that at least a portion of the audio input is not-recognized audio input and forwarding, in response to the audio input, help data to at least one of the audio and visual outputs, the help data indicating types of task requests that are available to the user.

15. A system comprising:
one or more computers and one or more storage devices on which are stored instructions that are operable, when executed by the one or more computers, to cause the one or more computers to perform operations comprising:

receiving audio input;
analyzing the audio input to determine a requested task;
categorizing, using an audio query categorization module, the requested task into a requested task category;
determining response data in response to the requested task;
determining, based at least in part on the requested task category, at least a first part of the response data to be presented as an audio output and at least a second part of the response data to be presented as a visual output, wherein the requested task category is, at least in part, a graphical category;
forwarding the first part of the response data to an audio output for presentation to a user;
forwarding the second part of the response data to a visual output for presentation to the user, the second part of the response incorporating a graph; and
forwarding to the visual output data describing sources of data incorporated into the response data wherein the sources include at least one of filings, news, market data, earnings call transcripts, sell-side equity analyst's opinions, and presentations from company management.

16. The system of claim 15, wherein the task is selected from a predetermined group of tasks.

17. The system of claim 16, wherein the predetermined group of tasks comprises: document retrieval, information retrieval, data visualization, and performance prediction.

18. The system of claim 15, wherein the operations further comprise receiving input subsequent to presentation of the response data.

19. The system of claim 15, wherein the audio input is second audio input and the operations further comprise:
receiving first audio input comprising activation audio;
forwarding, in response to the activation audio, help data to at least one of the audio and visual outputs, the help data indicating types of task requests that are available to the user.

20. The system of claim 15, wherein the operations further comprise recommending at least one of a task and data related to the requested task for the user to pursue in a further request.

21. The system of claim 15, wherein the audio data is first audio data, the requested task is a first requested task, and the operations further comprise
receiving second audio data after forwarding the first part of the response data and the second part of the response data; and
analyzing the second audio data to determine a second requested task.

22. The system of claim 15, wherein the operations further comprise determining an intent of a requested task and determining a type of response based on the intent of the requested task.

23. The system of claim 22, wherein determining an intent of a requested task comprises determining if a user is requesting at least one of a graph and a table.

24. The system of claim 15, wherein the requested task comprises a plurality of foundational tasks.

25. The system of claim 24, wherein a foundational task is selected from the group of foundational tasks comprising a document retrieval task, a information retrieval task, a numerical computation task, a data visualization task, and a projection task.

* * * * *